March 24, 1931. W. G. MAYER 1,797,530
SUBFRAME CONSTRUCTION
Filed Jan. 14, 1927 2 Sheets-Sheet 1

WITNESSES
a B Waddel.
William B Jaspert.

INVENTOR
William G. Mayer
by Winter Brown & Critchlow
his Attorneys.

March 24, 1931.  W. G. MAYER  1,797,530
SUBFRAME CONSTRUCTION
Filed Jan. 14, 1927  2 Sheets-Sheet 2

WITNESSES
INVENTOR
William G. Mayer
by Winter Brown & Critchlow
his attorneys.

Patented Mar. 24, 1931

1,797,530

UNITED STATES PATENT OFFICE

WILLIAM G. MAYER, OF PITTSBURGH, PENNSYLVANIA

SUBFRAME CONSTRUCTION

Application filed January 14, 1927. Serial No. 161,172.

This invention relates to vehicle body structures, more particularly to improvements in the sub-frame structure of truck bodies and the like.

It is among the objects of this invention to provide an improved sub-frame structure for truck bodies, which shall be of strong and durable mechanical construction, and which shall be manufactured of structural steel forms to provide the necessary rigidity and strength with a minimum of bulk and weight.

Another object of this invention is to provide an improved type of clamp for joining the structural element of which the sub-frame is formed which greatly facilitates the assembly and manufacture of the frame and permits the joining of certain available structural forms such as channel bars to obtain a suitable section.

Another object of the invention is to provide a sub-frame structure in which the side frame portion shall be formed at one end to constitute a bumper for the vehicle on which it is mounted.

In accordance with the present invention the clamping members are designed to join a plurality of longitudinal and transverse braces at their intersection. The clamps are designed to secure a plurality of channel members back to back to constitute an I-beam section, and to join said members with an I-beam or other structural member disposed transversely thereto. The clamps comprise a pair of clamping blocks of complementary shape adapted to be joined by a screw bolt or the like to secure the structural elements with which they are engaged in intimate contact to form a unitary member.

Figure 1:
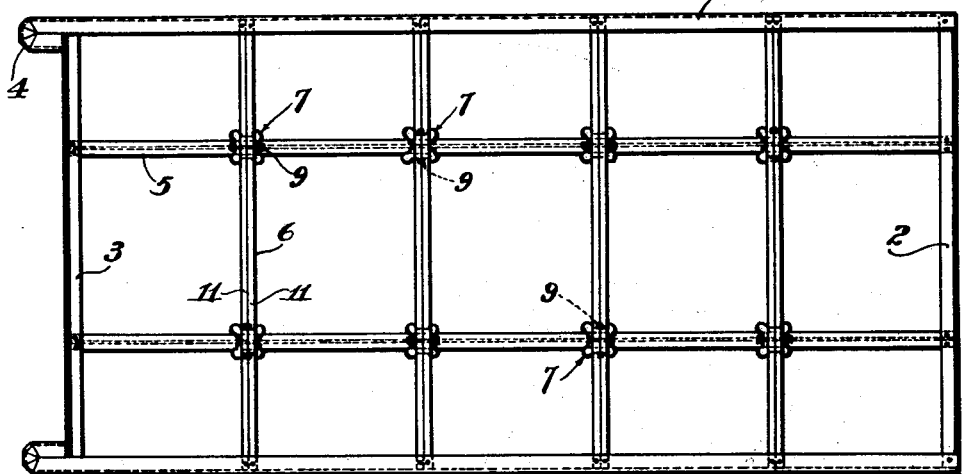
Figure 2:
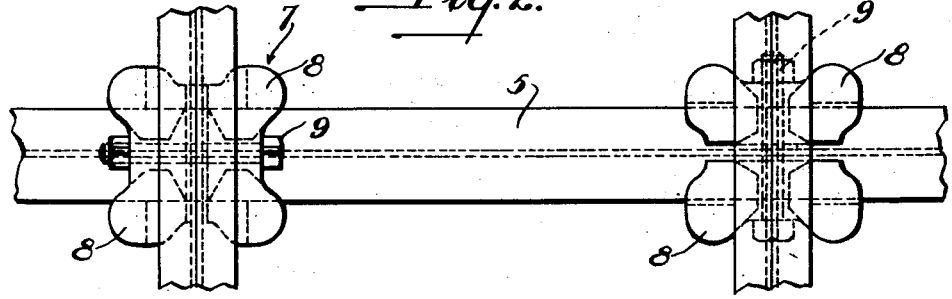
Figure 3:
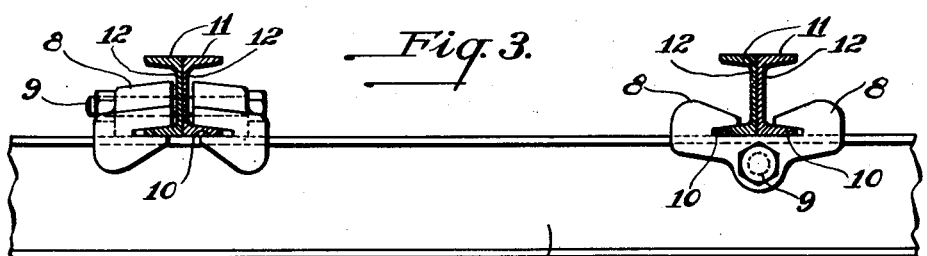
Figure 4:
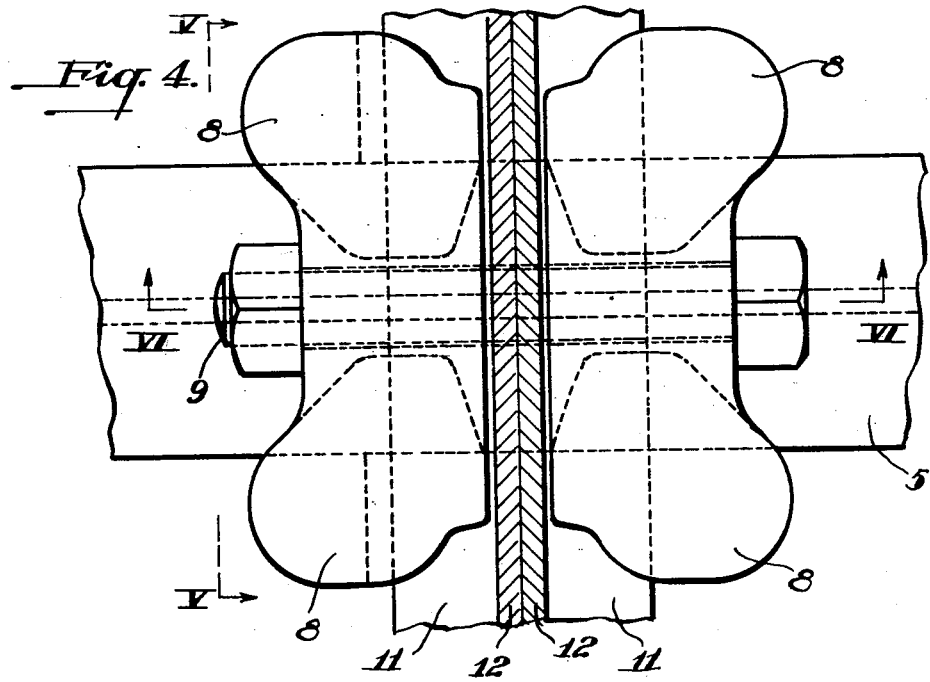
Figure 5:
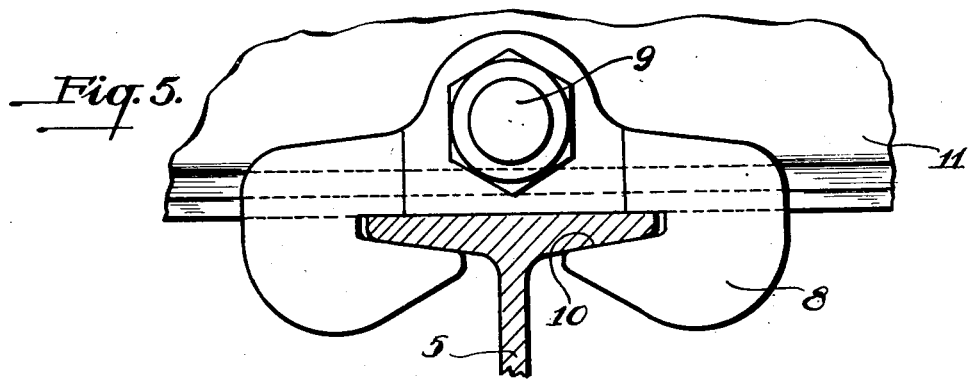
Figure 6:
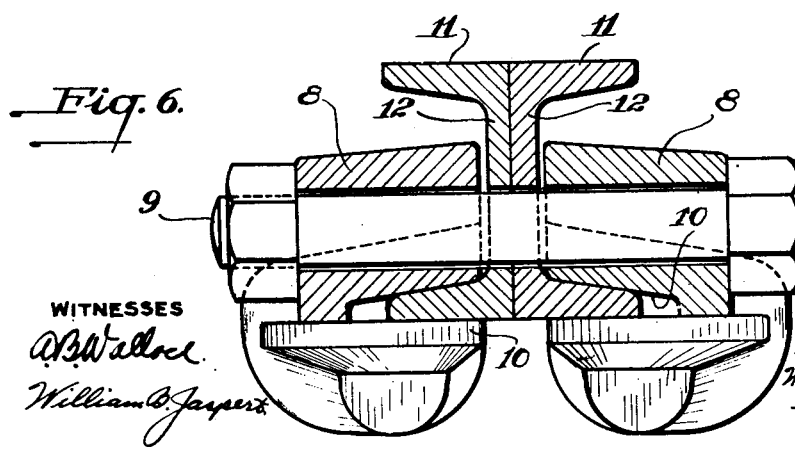

In the accompanying drawings constituting a part hereof and in which like reference characters designate like parts, Fig. 1 is a top plan view of a vehicle sub-frame structure embodying the principles of this invention; Fig. 2 an enlarged detail of a pair of clamping members joining longitudinal and transverse braces in suitable spaced relation; Fig. 3 a side elevational view partially in section of the details shown in Fig. 2; Figs. 4, 5 and 6, respectively illustrate a plan, an elevation, and a cross sectional view of the clamping members illustrating their manner of engagement with the structural members they are adapted to join; and Fig. 7 an enlarged detail of the end portion of the side frame which is formed into a bumper.

Figure 7:
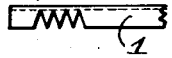

Referring to Fig. 1 of the drawings, the structure therein illustrated comprises a pair of side members 1 and end members 2 and 3 joined to constitute a rectangular frame member, the end member 3 being secured to the side members a convenient distance from the ends of the frame as shown. The side frames 1 at one end are cut out or notched, as shown in Fig. 7, and folded back upon themselves to constitute bumper members 4. The folding of the side frames in the manner shown produces a strong bumper which is further strengthened by the folded end abutting on the end frame 3. A plurality of longitudinal braces 5 disposed in parallel relation with the side frames 1 are secured to the end frames 2 and 3. A plurality of transverse braces 6 are secured in spaced relation at their ends to the side frames 1. The longitudinal braces 5 and the transverse braces 6 are joined at their intersection by clamps 7 to secure them in intimate engagement.

As shown in Figs. 1, 2 and 3, the clamps 7 comprise a pair of clamping blocks 8 of complementary shape which are adapted to be joined by bolts 9 to clamp the braces 5 and 6 which are perforated to receive the bolts 9. The clamps are alternately disposed, as shown in Fig. 1, to have the clamping bolts 9 disposed with their axes in alignment with the longitudinal and transverse braces, respectively. Since the variation of the disposition of the bolt axes requires that the bolts be alternately projected through openings in the transverse and longitudinal braces, as shown in Fig. 3, it is necessary to effect a corresponding disposition of the clamps per se, which produces rigid and secure interlocking of the braces.

With particular reference to Figs. 5 and 6 of the drawings, the clamping blocks 8 are of such shape and recessed in a manner to provide a pair of T-slots 10 and 10a in transverse relation when a pair of the clamps 8 are joined, and these slotted portions 10 and 10a are adapted to receive the flanges or legs 11 and 13 respectively of I-beams or channel sections as the case may be.

Structural sections utilized in the manufacture of vehicle bodies are of relatively small dimensions and light weight. Certain standard steel sections such as I-beams are not available in the sizes required for this purpose, but other sections such as channels and angle bars of suitable dimensions are manufactured of stock material in commercial quantities. To avoid the necessity of manufacturing special I-beams to meet the requirements in vehicle body construction the clamps are adapted to secure a pair of channel members 12, Fig. 6, in back to back relation to constitute in effect an I-beam section as shown. By means of the clamping members 8 channel sections may be utilized for both the longitudinal and transverse braces 5 and 6 to constitute I-beam sections, and the clamps are particularly designed for this purpose, the slotted portions 10 and 10a being shaped to correspond to the faces 11 and 13 of the channel legs as shown. This is particularly made clear in Fig. 6 of the drawings, where one of the slotted portions 10a is shown out of engagement with the channel member and the other running transversely of the axis of the bolt 9 is in intimate contact with flanges 11 of a pair of channel sections as shown.

Whether used with I-beams or I-sections made up from channels, the action of clamps 8 in achieving the rigid connection between the cross members is the same and may be understood from Figs. 4 to 6. The clamps are slid over member 5 toward the cross member, slots 10a permitting the clamps to slide freely on flanges 13 in being brought up to the cross member. When slot 10 meets and rides upon flange 11 the clamp is, in effect, raised, bringing the lower face of slot 10a against the lower face of flange 13. As the clamp is forced further into position, this action increases the pressure of the upper face of slot 10 on the upper face of flange 11 and that of the lower face of slot 10a on the under side of flange 13, until cross members 5 and 6 are rigidly connected by virtue of the clamping pressure thus created. Bolt 9 is then inserted and the nut tightened, and the cross members are restrained from relative movement in any direction.

In addition to the advantages obtained by the clamping members as hereinbefore mentioned the use of clamps as herein set forth permits the standardization of vehicle subframes to a certain extent and a particular advantage is that by means of the clamps the braces may be adjusted to assume any desired spaced relation. The frame and brace assembly is a simple matter when the clamp blocks are employed and permits shipping the sub-frame in a knocked-down condition to be assembled in the completed frame structure at its point of destination. It is also a simple matter to vary the width of the completed frame structure by simply cutting off the ends of the transverse members, and similarly the length of the frame may be altered by cutting off portions of the longitudinal frame section. The longitudinal and transverse braces may then be readily adjusted to their proper spaced relation to provide a symmetrically reinforced construction or strengthen the frame where desired.

It is evident from the foregoing description of this invention that vehicle sub-frame structures made in accordance therewith are of relatively simple and durable mechanical construction, inexpensive to manufacture and of light weight.

Although one embodiment of the invention has been herein described it will be obvious to those skilled in the art that the clamps may be utilized in joining structural elements of various shapes and in various relation without departing from the principles herein set forth.

I claim:

1. In a vehicle frame comprising side and end members and structural section intermediate cross braces superposed one above the other and crossing at right angles, the combination with said cross braces of clamps rigidly connecting the cross braces at their points of contact, said clamps comprising two opposed clamping blocks of complementary shape having transverse slots adapted to engage the adjacent flanges of the upper and lower cross braces and adapted upon movement of the blocks into gripping engagement with the flange on one member to apply lifting pressure to the flange of the other member whereby to draw the two crossed members into rigidly clamped relation, the blocks of each clamp being connected to each other and to one of the engaged cross braces by a single bolt passed therethrough, and the bolts passed through successive clamps alternately engaging the upper and lower braces whereby to prevent relative movement of the cross braces and provide a rigid structure.

2. In a vehicle frame comprising structural section side and end members and intermediate cross braces superposed one above the other and crossing at right angles, said braces each comprising a pair of channels in back-to-back relation, the combination with said cross braces of clamps rigidly connecting the braces at their points of contact, said clamps comprising two opposed clamping blocks of complementary shape, each block having transversely disposed slots for engagement of adjacent flanges of the upper and lower members, one of said slots engaging a flange of one of said members and the other slot engaging both of the adjacent flanges of the other member, movement of the blocks to bring the first-named slots into gripping engagement with the flange of one member applying lifting pressure to the flanges of the other member whereby to draw the two crossed members into rigidly clamped relation, the blocks of each clamp being connected to each other and to one of the engaged cross braces by a bolt passed therethrough, and successive clamps being disposed on the cross braces with said bolts alternately having their axes at right angles to each other.

In testimony whereof, I sign my name.

WILLIAM G. MAYER.